(12) United States Patent
Vook et al.

(10) Patent No.: US 11,057,095 B2
(45) Date of Patent: Jul. 6, 2021

(54) LOW-OVERHEAD HIGH-RANK CODEBOOK

(71) Applicant: Nokia Technologies Oy, Espoo (FI)

(72) Inventors: Frederick Vook, Schaumburg, IL (US);
William Hillery, Lafayette, IN (US);
Mihai Enescu, Espoo (FI); Eugene Visotsky, Buffalo Grove, IL (US);
Xiaomao Mao, Palaiseau (FR); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/611,614

(22) PCT Filed: May 8, 2018

(86) PCT No.: PCT/IB2018/053200
§ 371 (c)(1),
(2) Date: Nov. 7, 2019

(87) PCT Pub. No.: WO2018/207100
PCT Pub. Date: Nov. 15, 2018

(65) Prior Publication Data
US 2020/0169309 A1    May 28, 2020

Related U.S. Application Data

(60) Provisional application No. 62/504,304, filed on May 10, 2017.

(51) Int. Cl.
*H04B 7/02* (2018.01)
*H04B 7/06* (2006.01)
*H04B 7/0456* (2017.01)

(52) U.S. Cl.
CPC ......... *H04B 7/0639* (2013.01); *H04B 7/0469* (2013.01); *H04B 7/0478* (2013.01); *H04B 7/0617* (2013.01); *H04B 7/0632* (2013.01)

(58) Field of Classification Search
CPC .. H04B 7/0639; H04B 7/0478; H04B 7/0469; H04B 7/0617; H04B 7/0632
(Continued)

(56) References Cited

U.S. PATENT DOCUMENTS

2009/0274225 A1  11/2009  Khojastepour et al.
2011/0080969 A1  4/2011  Jongren et al.
(Continued)

FOREIGN PATENT DOCUMENTS

| WO | 2014/052806 A1 | 4/2014 |
| WO | 2014/137203 A2 | 9/2014 |
| WO | 2016/120443 A1 | 8/2016 |

OTHER PUBLICATIONS

International Search Report and Written Opinion received for corresponding Patent Cooperation Treaty Application No. PCT/IB2018/053200, dated Oct. 12, 2018, 13 pages.
(Continued)

*Primary Examiner* — Don N Vo
(74) *Attorney, Agent, or Firm* — Squire Patton Boggs (US) LLP

(57) ABSTRACT

Various communication system may benefit from the appropriate selection of communication parameters. For example, certain wireless communication systems may benefit from the user of a low-overhead high-rank codebook. A method can include determining a first partition of a precoding matrix with a higher resolution and a second partition of the precoding matrix with a lower resolution. The method can also include feeding back the first partition and the second partition.

20 Claims, 5 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2011/0170623 A1* | 7/2011 | Park | .................... H04L 25/0224 375/260 |
| 2011/0194638 A1 | 8/2011 | Erell et al. | |
| 2014/0328422 A1 | 11/2014 | Chen et al. | |
| 2014/0334567 A1* | 11/2014 | Khojastepour | ...... H04B 7/0456 375/267 |
| 2014/0341312 A1 | 11/2014 | Lee et al. | |
| 2016/0218780 A1 | 7/2016 | Zhang et al. | |
| 2019/0068315 A1* | 2/2019 | Ryden | .................. H04B 7/0602 |

OTHER PUBLICATIONS

Extended European Search Report dated Jan. 28, 2021 corresponding to European Patent Application No. 18798135.2.

* cited by examiner

LOW-OVERHEAD HIGH-RANK CODEBOOK

RELATED APPLICATION

This application was originally filed as PCT Application No. PCT/IB2018/053200, filed on May 8, 2018, which claims priority from U.S. Provisional Application No. 62/504,304, filed on May 10, 2017.

BACKGROUND

Field

Various communication systems may benefit from the appropriate selection of communication parameters. For example, certain wireless communication systems may benefit from the user of a low-overhead high-rank codebook.

Description of the Related Art

Physical layer specifications are one aspect of third generation partnership project (3GPP) development of fifth generation (5G) New Radio (NR) technology. One component of NR is multi-antenna transmission technology in both the downlink (DL) and uplink (UL). NR support for multi-input multi-output (MIMO) technology will extend to large antenna arrays and relies on methods for obtaining channel state information (CSI) at the transmitter.

BRIEF DESCRIPTION OF THE DRAWINGS

For proper understanding of the invention, reference should be made to the accompanying drawings, wherein.

DETAILED DESCRIPTION

One method for obtaining channel state information is for the receiver to measure the channel and to feed CSI back by choosing the best element of a standardized codebook and feeding back the index of the element.

Certain embodiments relate to the design of Type 1 codebooks for feeding back CSI for large antenna arrays. Moreover, certain embodiments focus on the design for high rank transmission, such as rank 5 through 8.

For CSI acquisition, 3GPP LTE has currently defined codebooks for single-panel one dimensional (1D) and two dimensional (2D) antenna arrays. The codebooks in Rel-13/14 are two-stage codebooks of the form $W=W_1 W_2$, where $W_1$ is a matrix containing beams from an oversampled two-dimensional DFT grid and $W_2$ selects and combines those beams to create the overall precoding matrix. As in LTE, $W_1$ is normally chosen based on wideband channel statistics and $W_2$ may vary by subband. In 3GPP NR, the codebook designs have been split into Type 1 and Type 2, but the design for Ranks 3-4 and Ranks 5-8 are not currently defined. Certain embodiments describe several codebook design options for Ranks 5-8.

Thus, certain embodiments describe several strategies for the design of multi-rank codebooks currently being standardized in 3GPP NR for single panel and multi panel transmission. Various alternatives and variations are presented around a first example, and other variations and alternatives are also permitted.

Figure 1:
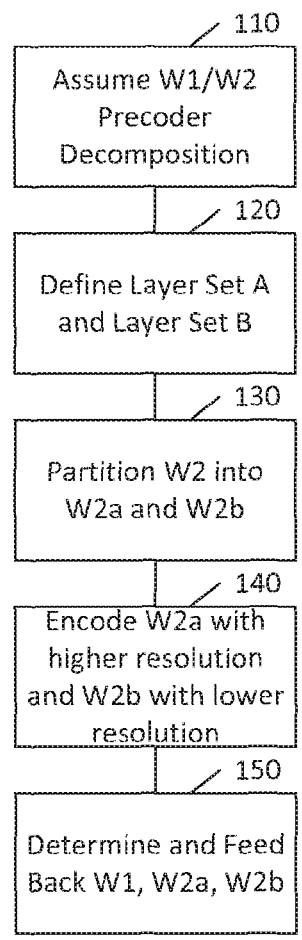
FIG. 1 illustrates a first example of a method according to certain embodiments.

FIG. 1 illustrates a first example of a method according to certain embodiments. At 110, a $W_1/W_2$ precoder decomposition, as described above, can be assumed. In this example, ranks 5-8 are considered. As an example, $W_1$ can be partitioned as $$\begin{bmatrix} B & 0 \\ 0 & B \end{bmatrix},$$

where B is Np/2 by Nb, where Np is the total number of ports, and Nb is the total number of, for example discrete Fourier transform (DFT), beams in the $W_1$ per polarization. Other formats for $W_1$ can be applicable as well. For example, $$W_1 = \begin{bmatrix} B_1 & 0 \\ 0 & B_2 \end{bmatrix}$$

is possible. $W_2$ can have a size of 2 Nb by r, where r is the rank of the final precoder.

At 120, two layer sets can be defined: Layer Set A and Layer Set B, where Layer Set A can include the set of layers over which Codeword 1 is mapped, and Layer Set B can include the set of layers over which Codeword 2 is mapped. The layers that belong to Layer Set A or B can be fixed according to the codeword to layer mapping. Additional methods for separating the layers into sets are possible. It is also possible to divide the layers into more than two sets, which may be appropriate when the layers transmit more than two codewords. The embodiments herein described use two layer sets as an illustrative example.

In one option, a predefined codeword to layer mapping strategy can be precisely followed. Alternatively, there can be an adaptation of the layers that belong to which layer sets. The number of layers per codeword can be kept the same as what is specified in the codeword-to-layer mapping, but which layers should go in which layer set can be selected.

For example, two codewords may be used for ranks 5-8, and one codeword may be used for ranks 1-4. However, the exact codeword to layer mapping strategy, namely which codewords are mapped to which layers and how time/frequency is handled, may be variously implemented.

Figure 2:
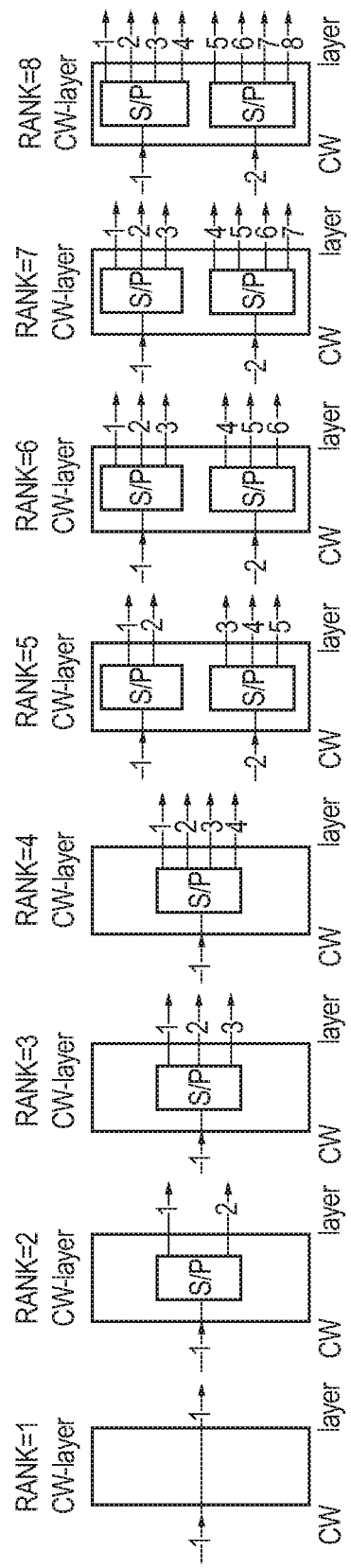
FIG. 2 illustrates codeword to layer mapping options, according to certain embodiments.

FIG. 2 illustrates codeword to layer mapping options, according to certain embodiments. For example, FIG. 2 shows how for ranks 1 through 4, a single codeword (CW) can be mapped to one or more layers. Likewise, for ranks 5 through 8, two codewords can each be mapped to two or more layers.

Layer set A can be defined as the set of layers to which codeword 1 is mapped, while layer set B can be defined as the set of layers to which codeword 2 is mapped.

Thus, an example codeword-to-layer mapping can be as follows, which is shown in FIG. 2: for rank 5, codeword 1 on layers 1-2, codeword 2 on layers 3-5, thereby providing layer set A={1, 2} and layer set B={3, 4, 5}; for rank 6, codeword 1 on layers 1-3 and codeword 2 on layers 4-6, thereby providing layer set A={1, 2, 3} and layer set B={4, 5, 6}; for rank 7, codeword 1 on layers 1-3 and codeword 2 on layers 4-7, thereby providing layer set A={1, 2, 3} and layer set B={4, 5, 6, 7}; and for rank 8, codeword 1 on layers 1-4 and codeword 2 on layers 5-8, thereby providing layer set A={1, 2, 3, 4} and layer set B={5, 6, 7, 8}.

Another example of separating the layers into sets which does not follow the codeword-to-layer mapping precisely can be as follows: for rank 6, codeword 1 on layers 1-3 and codeword 2 on layers 4-6 providing layer set A={1, 2, 3, 4} and layer set B={5, 6}. In this example, the layer sets are determined partially by the codeword-to-layer mapping and partially by a desire to keep layer pairs in the same layer set to maintain orthogonality of two layers using the same beam from $W_1$. This may relate to the practical case where layers using the same beam from $W_1$ are to be in the same layer set. Assigning the layers to sets can use a variety of criteria, one of which can be codeword-to-layer mapping.

Even if multiple layers of FIG. 2 are using a single codeword, such as layers 2-4, they can be providing layer sets as follows: for rank 2 the layer set A={1} and layer set B={2}, for rank 3 the layer set A={1} and layer set B={2, 3}, for rank 4 the layer set A={1, 2} and layer set B={3, 4}.

Alternative layers sets arrangement can be: for rank 3 the layer set A={1, 2} and layer set B={3}; for rank 4 the layer set A={1} and layer set B={2, 3, 4}; for rank 5, codeword 1 on layers 1, codeword 2 on layers 2-5, thereby providing layer set A={1, 2, 3} and layer set B={4, 5}; for rank 6, codeword 1 on layers 1-2 and codeword 2 on layers 3-6, thereby providing layer set A={1, 2} and layer set B={3, 4, 5, 6}; for rank 7, codeword 1 on layers 1-4 and codeword 2 on layers 5-7, thereby providing layer set A={1, 2, 3, 4} and layer set B={5, 6, 7}; and for rank 8, codeword 1 on layers 1-3 and codeword 2 on layers 4-8, thereby providing layer set A={1, 2, 3} and layer set B={4, 5, 6, 7, 8}.

As shown in FIG. 1, at 130, $W_2$ can be partitioned in this way: $W_2=[W_{2a}\ W_{2b}]$, where the $W_{2a}$ is for the layers in Layer Set A, and $W_{2b}$ is for the layers in Layer Set B.

Next, at 140, $W_{2a}$ can be encoded with a higher resolution/frequency-selective encoding strategy, while $W_{2b}$ can be encoded with a lower or zero-overhead and possibly frequency non-selective encoding strategy.

The strategy for picking $W_{2a}$ can follow the traditional design strategies used for $W_2$ for Ranks 1 ... 4 in the LTE codebooks. For example, $W_{2a}$ can select and co-phase the beams in $W_1$ and could be selected on a sub-band basis. The strategy for picking $W_{2b}$ can follow a much simpler and low/zero overhead strategy compared to the strategy for picking $W_{2a}$. For example, Selection of $W_{2b}$ can follow the traditional design strategies used for $W_2$ for Ranks 5 through 8 in the LTE codebooks, which is a strategy where $W_{2b}$ is not selected on a sub-band basis, and/or there is only one choice for $W_{2b}$ (zero bits of feedback).

This strategy may enable the higher rank transmission to enjoy the benefits of higher resolution/frequency selective $W_2$, but at the same time limit the overhead that is required. As a result of this strategy, the codeword in layer set A may have a higher quality than the codeword in layer set B, but the link adaptation can set the proper modulation and coding scheme (MCS) for each codeword accordingly. Also, higher rank transmission would tend to be viable in rich multipath environments, where the spatial response is highly likely to be frequency selective (due to the combination of angle spread and delay spread).

As shown at 150 in FIG. 1, a user equipment (UE) can determine and feed back $W_1$, $W_{2a}$, and $W_{2b}$.

Optionally, a signaling methodology can be defined to permit the UE to indicate to the base station which layers belong to layer set A and which layers belong to layer set B. A layer set indicator can serve this purpose. This can be in particular used when a single codeword is mapped to a number of layers as shown in FIG. 2 for ranks 2-4.

Figure 5:
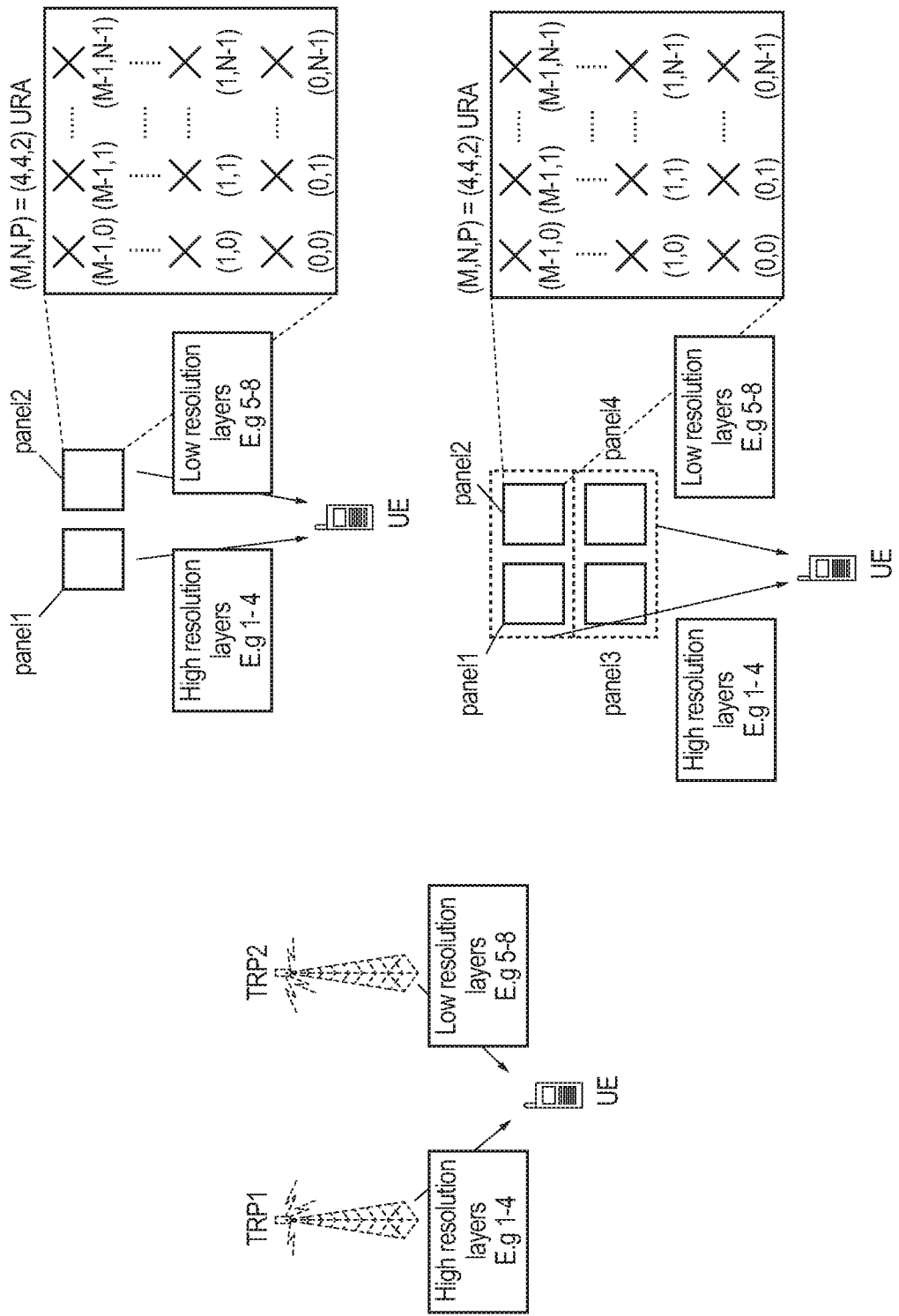
FIG. 5 illustrates multipanel transmission according to certain embodiments.

FIG. 5 illustrates multipanel transmission according to certain embodiments. As shown in FIG. 5, higher resolution layers set A and lower resolution layers set B can be utilized for a multipanel transmission where the higher resolution layers are transmitted from a first panel and the lower resolution layers are transmitted from a second panel, or where the higher resolution layers can be transmitted from a first set of panels and the lower resolution layers are transmitted from a second set of panels.

As in multi-point transmission the channel conditions can differ between two transmission points, a high resolution layer set A may be transmitted from a transmission point (TRP) 1 and a low resolution set of layers B from a TRP 2, these two sets of layers being transmitted in a non-coherent way.

Alternatively, the layers transmitted from each TRP or panel can be split into a set of high-resolution layers and a set of low-resolution layers. This may be useful when a large number of layers is supported for transmission from each panel or TRP. Thus, the feedback of $W_{2a}$ and $W_{2b}$ is per panel or TRP where $W_{2a}$ corresponds to high resolution layer set A and $W_{2b}$ corresponds to the low-resolution layer set B for the panel or TRP.

This optional strategy may be useful when codeword 1 is mapped to Layer Set A, which may include higher quality layers and may benefit more from the higher resolution and frequency-selective precoding. Similarly codeword 2 may be mapped to layer set B, which may include the lower quality layers and may not benefit as much from high resolution/frequency selective precoding. Link adaptation can set the MCS for codeword 1 and codeword 2 according to the overall channel quality provided by the layer set over which the respective codewords are mapped.

An example for indicating which layers are in which layer set is a bit map of length equal to the rank. Each entry can be either zero, meaning that layer belongs to layer set A, or one, meaning that the layer belongs to layer set B. Other more efficient indication methodologies may also be applied, as ordering of the layers within a Layer Set may be immaterial.

Another alternative is to pair the layer-set indication with rank indicator (RI) feedback. The same number of bits as is used for RI indication can also be reserved for indication of layer set A. If the indicated rank is R and the layer set indication is N≤R, then the first N layers can correspond to layer set A. The remaining R-N layers can correspond to layer set B.

A CSI reporting setting can be defined, which may allow the next generation Node B (gNB) to configure feedback of $W_{2a}$ and $W_{2b}$ independently. The reporting of $W_{2a}$ and $W_{2b}$ can be done with different periodicities and may be transmitted on different uplink channels or jointly encoded with different parameters such as the high resolution $W_{2a}$ may be encoded with rank indication, or alternatively the $W_{2b}$ may be encoded with rank indication. It may be useful to feed back $W_{2a}$, if it corresponds to the high-quality layers, more frequently than $W_{2b}$, when it corresponds to the low-quality layers.

For example, the gNB may a configure a CSI reporting setting for periodic reporting of $W_{2a}$ with a periodicity X and another CSI reporting setting for periodic reporting setting of $W_{2b}$ with a periodicity Y>X. Alternatively, the reporting of $W_{2b}$ can be aperiodically triggered. Splitting the reporting of $W_{2a}$ and $W_{2b}$ feedback may allow for high-resolution feedback of $W_{2b}$ also but less frequently than feedback of $W_{2a}$, resulting in less long-term overhead associated with $W_{2b}$ feedback than with $W_{2a}$ feedback. Thus, for example, high resolution feedback of $W_{2b}$ also is not precluded with separate reporting of $W_{2a}$ and $W_{2b}$. This aspect could be used to provide $W_{2b}$ feedback less frequently, resulting in less overhead than for $W_{2a}$.

If the layer set determination is adaptable, then the UE can determine which layers belong to layer set A and which layers belong to Layer Set B. The methodology for determining which layers should belong to the two layer sets may be variously implemented. The layers in layer set A can be precoded according to the higher overhead strategy described above, whereas the layers in layer set B can be precoded according to the lower overhead strategy described above. The UE can be free to select which layers should be in set A versus which layers should be in set B. The framework may equally support the strategy where the weaker layers are in set A and the stronger layers are in set B and vice-versa.

As mentioned above, at 150, the UE can determine and feed back the $W_1$, $W_{2a}$, $W_{2b}$. This feedback can also optionally include the layer set indicator. The number of beams in $W_1$ may be appropriate for the rank. Moreover, the choice of $W_{2a}$, $W_{2b}$ may be done in a way that creates a set of orthogonal precoders.

An additional alternative/variation for the optional case of adapting which layers are in set A versus set B is as follows. In the above description, layer set A has codeword 1 and higher resolution $W_2$, whereas layer set B has codeword 2 and lower resolution $W_2$, and it was optional to decide ahead of time which layers belong to layer set A versus layer set B.

In some cases, however, it may not be viable to know ahead of time which layers should be in set A versus set B. Therefore, an alternative is to say layer set A has higher resolution $W_2$, layer set B has lower resolution $W_2$. Then, once the precoders are known, the quality of the resulting streams can be determined and codeword 1 can be mapped over the best streams while codeword 2 can be mapped over the worst streams. The UE can then indicate to the base station the codeword to layer mapping that the UE prefers. The UE can then feed back the $W_1/W_{2a}/W_{2b}$ and channel quality information (CQI) for both codewords along with the codeword to layer mapping.

Current codebook designs for the long term evolution (LTE) codebooks for higher rank (for example, rank>4) are generally lower resolution and require lower feedback than the LTE codebooks for lower ranks (for example, ranks<=4). For example, in the LTE Rel-10 codebooks for higher rank transmission, there is only one choice for $W_2$, meaning no feedback is needed for $W_2$, and $W_2$ is fixed across the band.

In certain embodiments, by contrast, higher rank transmission may benefit from codebook feedback design practices used for lower rank transmission. For example, a $W_2$ can select and co-phase the beams in $W_1$ and can vary across the band. However, an additional design requirement can be low overhead. Certain embodiments can reduce overhead by having codeword 1 benefit from the higher resolution/ frequency selective $W_2$, but codeword 2 can use the lower resolution/frequency flat $W_2$.

The additional coherent gain provided by a higher resolution $W_2$ may be beneficial even in the high rank case, given how the total transmit power is divided over all the ranks. Furthermore, the higher ranks may be supported in extremely rich multipath environments, which may have frequency selective spatial responses. In such cases, there may be a need for frequency selective precoding. Certain embodiments provide principles that can provide a good trade-off between the demand for lower feedback and the need for frequency-selective precoding in the higher rank cases.

Figure 3:
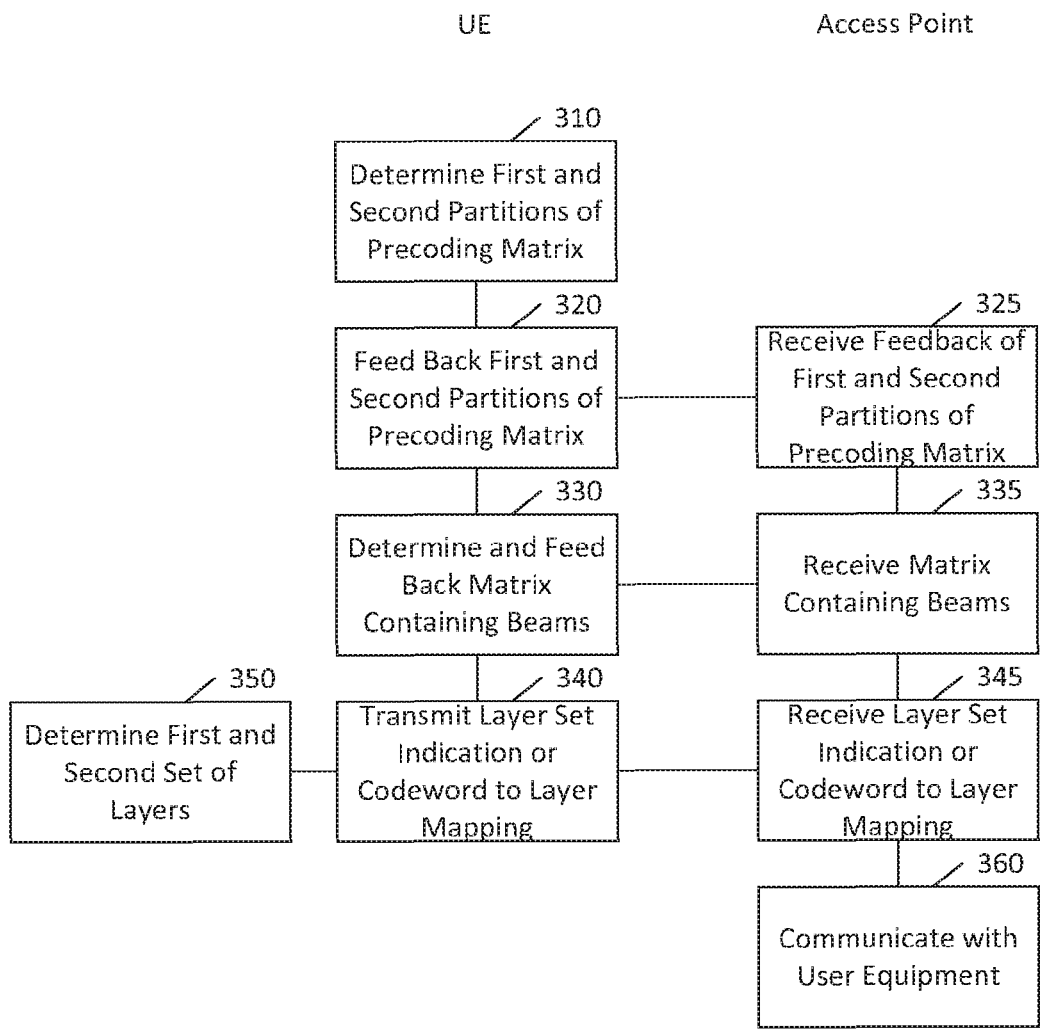
FIG. 3 illustrates a method according to certain embodiments.

FIG. 3 illustrates a method according to certain embodiments. As shown in FIG. 3, a method can include, at 310, determining a first partition of a precoding matrix with a higher resolution and a second partition of the precoding matrix with a lower resolution. The precoding matrix can be W2, the first partition can be W2a, and the second partition can be W2b, such that W2=[W2a W2b], as described above.

The method can also include, at 320, feeding back the first partition and the second partition. This feedback can be received by an access point, such as a base station, at 325. The feeding back of the first partition can be done with a different periodicity from the feeding back of the second partition.

The method can further include, at 330, determining and feeding back a matrix containing beams from an oversampled discrete Fourier transform grid. The matrix containing the beams can be W1. This matrix can be received by the access point at 335.

The method can additionally include, at 340, transmitting with the feeding back, an indication of a first set of layers corresponding to the first partition and a second set of layers corresponding to the second partition. Alternatively, at 340, the method can include providing any codeword to layer mapping to the base station. This feedback or mapping can be received by the access point at 345.

The method can also include, at 350, determining a first set of layers for the first partition and a second set of layers for the second partition.

The access point can, at 360, communicate with a user equipment based on the received first partition and second partition, as well as based on any of the additional information described as received above.

A detailed codebook design that follows the above principles for transmission ranks 5 through 8 is as follows. For a 2D cross-pol array having $N_1$ rows and $N_2$ columns, the precoder follows a $W_1W_2$ structure where $W_1$ has the following structure:

$$W_1 = \begin{bmatrix} B & 0 \\ 0 & B \end{bmatrix}, B = [b_0, \ldots, b_{L-1}];$$

where $W_1$ is $2N_1N_2 \times 2L$, where the $b_i$ are DFT beams of length $N_1N_2$, L is the number of beams per polarization. $W_2$ has the following form for Ranks 5, 6, 7, 8, respectively:

Rank 5:

$$W_2 = \begin{bmatrix} e_{k_0} & e_{k_0} & e_{k_1} & e_{k_1} & e_{k_2} \\ \varphi_0 e_{k_0} & \varphi_1 e_{k_0} & \varphi_2 e_{k_1} & \varphi_3 e_{k_1} & \varphi_4 e_{k_2} \end{bmatrix}$$

Rank 6:

$$W_2 = \begin{bmatrix} e_{k_0} & e_{k_0} & e_{k_1} & e_{k_1} & e_{k_2} & e_{k_2} \\ \varphi_0 e_{k_0} & \varphi_1 e_{k_0} & \varphi_2 e_{k_1} & \varphi_3 e_{k_1} & \varphi_4 e_{k_2} & \varphi_5 e_{k_2} \end{bmatrix}$$

Rank 7:

$$W_2 = \begin{bmatrix} e_{k_0} & e_{k_0} & e_{k_1} & e_{k_2} & e_{k_2} & e_{k_3} & e_{k_3} \\ \varphi_0 e_{k_0} & \varphi_1 e_{k_0} & \varphi_2 e_{k_1} & \varphi_3 e_{k_2} & \varphi_4 e_{k_2} & \varphi_5 e_{k_3} & \varphi_6 e_{k_3} \end{bmatrix}$$

Rank 8:

$$W_2 = \begin{bmatrix} e_{k_0} & e_{k_0} & e_{k_1} & e_{k_1} & e_{k_2} & e_{k_2} & e_{k_3} & e_{k_3} \\ \varphi_0 e_{k_0} & \varphi_1 e_{k_0} & \varphi_2 e_{k_1} & \varphi_3 e_{k_1} & \varphi_4 e_{k_2} & \varphi_5 e_{k_2} & \varphi_6 e_{k_3} & \varphi_7 e_{k_3} \end{bmatrix}$$

where $e_{k_i}$ is an indicator vector having all zeros except for a one in position $k_i$, and $\varphi_j$ is a scalar co-phasing term for layer j. Note that with this structure, L must be greater than or equal to ceil (Rank/2). The final precoder is given by:

$$W = \frac{1}{\sqrt{2RN_1N_2}} W_1 W_2 = \frac{1}{\sqrt{2RN_1N_2}} \begin{bmatrix} w_{0,0} & w_{0,1} & \ldots & w_{0,R-1} \\ w_{1,0} & w_{1,1} & \ldots & w_{1,R-1} \end{bmatrix}$$

for rank $R \in \{5, 6, 7, 8\}$

The above structure assumes that each pair of layers are formed from the same DFT beam in B, which is shown by the structure of $W_2$ where columns l and l+1 (for layers l and l+1 respectively) both typically contain the indicator vector $e_{k_i}$ where i=floor (l/2). The exception is the rank 5 and 7 cases, which are handled slightly differently since one of the layers has no associated paired layer. Also, note that with the above structure for $W_2$, the columns of $W_2$ that correspond to the first set of layers would be included in W2a, whereas the columns of $W_2$ that correspond to the second set of layers would be included in W2b.

With the above structure for $W_2$, we have several example options for the selection of $\varphi_j$ for layer j, which determines the final value of $W_2$: In the following options, the vector $\varphi = [\varphi_0 \ldots \varphi_{R-1}]$, where R is the transmission rank.

Example Option 0 (same precoder resolution on all layers): 1 bit per sub-band in W2, and all layers have the same precoder resolution in $W_2$ (l is layer, n refers to the choice (n=0 or 1) that the UE will make for determining the best W2.

Rank 5:
n=0: $\varphi=[1\ -1\ 1\ -1\ 1]$
n=1: $\varphi=[j\ -j\ j\ -j\ j]$
Rank 6:
n=0: $\varphi=[1\ -1\ 1\ -1\ 1\ -1]$
n=1: $\varphi=[j\ -j\ j\ -j\ j\ -j]$
Rank 7:
n=0: $\varphi=[1\ -1\ 1\ -1\ 1\ -1\ 1]$
n=1: $=[j\ -j\ j\ -j\ j\ -j\ j]$
Rank 8:
n=0: $\varphi=[1\ -1\ 1\ -1\ 1\ -1\ 1\ -1]$
n=1: $\varphi=[j\ -j\ j\ -j\ j\ -j\ j\ -j]$ Example Option 1: 1 bit to specify W2a for first set of layers, 0 bits to specify W2b for second set of layers (i.e., no choice for W2 for the second set of layers).

Rank 5: W2a handles the first layer set (first two layers) with 1 bit, W2b handles the second layer set (last three layers) with 0 bits (no choices).
n=0: $\varphi=[1\ -1\ 1\ -1\ 1]$
n=1: $\varphi=[j\ -j\ 1\ -1\ 1]$ Rank 6: W2a handles the first layer set (first four layers) with 1 bit, W2b handles the second layer set (last two layers) with 0 bits (no choices).
n=0: $\varphi=[1\ -1\ 1\ -1\ 1\ -1]$
n=1: $\varphi=[j\ -j\ j\ -j\ 1\ -1]$ Rank 7: W2a handles the first layer set (first three layers) with 1 bit, W2b handles the second layer set (last four layers) with 0 bits (no choices).
n=0: $\varphi=[1\ -1\ 1\ 1\ -1\ 1\ -1]$
n=1: $\varphi=[j\ -j\ j\ 1\ -1\ 1\ -1]$ Rank 8: W2a handles the first layer set (first four layers) with 1 bit, W2b handles the second layer set (last four layers) with 0 bits (no choices):
n=0: $\varphi=[1\ -1\ 1\ -1\ 1\ -1\ 1\ -1]$
n=1: $\varphi=[j\ -j\ j\ -j\ 1\ -1\ 1\ -1]$ Example Option 2: 2 bits to specify W2a for the first set of layers, 0 bits to specify W2b for the second set of layers (i.e., no choice for the W2b for the second set of layers).

Rank 5: W2a handles the first layer set (first two layers) with 2 bits, W2b handles the second layer set (last three layers) with 0 bits (no choices).
n=0: $\varphi=[e^{j0\pi/4}\ -e^{j0\pi/4}\ 1\ -1\ 1]$
n=1: $\varphi=[e^{j1\pi/4}\ -e^{j1\pi/4}\ 1\ -1\ 1]$
n=2: $\varphi=[e^{j2\pi/4}\ -e^{j2\pi/4}\ 1\ -1\ 1]$
n=3: $\varphi=[e^{j3\pi/4}\ -e^{j3\pi/4}\ 1\ -1\ 1]$ Rank 6: W2a handles the first layer set (first four layers) with 2 bits (four choices), W2b handles the second layer set (last two layers) with 0 bits (no choices).
n=0: $\varphi=[e^{j0\pi/4}\ -e^{j0\pi/4}\ e^{j0\pi/4}\ -e^{j0\pi/4}\ 1\ -1]$
n=1: $\varphi=[e^{j1\pi/4}\ -e^{j1\pi/4}\ e^{j1\pi/4}\ -e^{j1\pi/4}\ 1\ -1]$
n=2: $\varphi=[e^{j2\pi/4}\ -e^{j2\pi/4}\ e^{j2\pi/4}\ -e^{j2\pi/4}\ 1\ -1]$
n=3: $\varphi=[e^{j3\pi/4}\ -e^{j3\pi/4}\ e^{j3\pi/4}\ -e^{j3\pi/4}\ 1\ -1]$ Rank 7: W2a handles the first layer set (first three layers) with 2 bits (four choices), W2b handles the second layer set (last four layers) with 0 bits (no choices).
n=0: $\varphi=[e^{j0\pi/4}\ -e^{j0\pi/4}\ e^{j0\pi/4}\ 1\ -1\ 1\ -1]$
n=1: $\varphi=[e^{j1\pi/4}\ -e^{j1\pi/4}\ e^{j1\pi/4}\ 1\ -1\ 1\ -1]$
n=2: $\varphi=[e^{j2\pi/4}\ -e^{j2\pi/4}\ e^{j2\pi/4}\ 1\ -1\ 1\ -1]$
n=3: $\varphi=[e^{j3\pi/4}\ -e^{j3\pi/4}\ e^{j3\pi/4}\ 1\ -1\ 1\ -1]$ Rank 8: W2a handles the first layer set (first four layers) with 2 bits (four choices), W2b handles the second layer set (last four layers) with 0 bits (no choices):
n=0: $\varphi=[e^{j0\pi/4}\ -e^{j0\pi/4}\ e^{j0\pi/4}\ -e^{j0\pi/4}\ 1\ -1\ 1\ -1]$
n=1: $\varphi=[e^{j1\pi/4}\ -e^{j1\pi/4}\ e^{j1\pi/4}\ -e^{j1\pi/4}\ 1\ -1\ 1\ -1]$
n=2: $\varphi=[e^{j2\pi/4}\ -e^{j2\pi/4}\ e^{j2\pi/4}\ -e^{j2\pi/4}\ 1\ -1\ 1\ -1]$
n=3: $\varphi=[e^{j3\pi/4}\ -e^{j3\pi/4}\ e^{j3\pi/4}\ -e^{j3\pi/4}\ 1\ -1\ 1\ -1]$ Example Option 3: 2 bits to specify W2a for the first set of layers (i.e., 4 choices for the first set of layers), 1 bit to specify W2b for the second set of layers (i.e., two choices for the W2b for the second set of layers), 3 total bits to specify $W_2$, and the structure below assumes the 2+1 bits are signaled together (all 3 bits signaled either on a wideband basis or on a sub-band basis, although other options for signaling these 2+1 bits are discussed below).

Rank 5: W2a handles the first layer set (first two layers) with 2 bits, W2b handles the second layer set (last three layers) with 1 bit (two choices).
n=0: $\varphi=[e^{j0\pi/4}\ -e^{j0\pi/4}\ 1\ -1\ 1]$
n=1: $\varphi=[e^{j0\pi/4}\ -e^{j0\pi/4}\ j\ -j\ j]$
n=2: $\varphi=[e^{j1\pi/4}\ -e^{j1\pi/4}\ 1\ -1\ 1]$
n=3: $\varphi=[e^{j1\pi/4}\ -e^{j1\pi/4}\ j\ -j\ j]$
n=4: $\varphi=[e^{j2\pi/4}\ -e^{j2\pi/4}\ 1\ -1\ 1]$
n=5: $\varphi=[e^{j2\pi/4}\ -e^{j2\pi/4}\ j\ -j\ j]$
n=6: $\varphi=[e^{j3\pi/4}\ -e^{j3\pi/4}\ 1\ -1\ 1]$
n=7: $\varphi=[e^{j3\pi/4}\ -e^{j3\pi/4}\ j\ -j\ j]$ Rank 6: W2a handles the first layer set (first four layers) with 2 bits (four choices), W2b handles the second layer set (last two layers) with 1 bit (two choices).
n=0: $\varphi=[e^{j0\pi/4} \ -e^{j0\pi/4} \ e^{j0\pi/4} \ -e^{j0\pi/4} \ 1 \ -1]$
n=1: $\varphi=[e^{j0\pi/4} \ -e^{j0\pi/4} \ e^{j0\pi/4} \ -e^{j0\pi/4} \ j \ -j]$
n=2: $\varphi=[e^{j1\pi/4} \ -e^{j1\pi/4} \ e^{j1\pi/4} \ -e^{j1\pi/4} \ 1 \ -1]$
n=3: $\varphi=[e^{j1\pi/4} \ -e^{j1\pi/4} \ e^{j1\pi/4} \ -e^{j1\pi/4} \ j \ -j]$
n=4: $\varphi=[e^{j2\pi/4} \ -e^{j2\pi/4} \ e^{j2\pi/4} \ -e^{j2\pi/4} \ 1 \ -1]$
n=5: $\varphi=[e^{j2\pi/4} \ -e^{j2\pi/4} \ e^{j2\pi/4} \ -e^{j2\pi/4} \ j \ -j]$
n=6: $\varphi=[e^{j3\pi/4} \ -e^{j3\pi/4} \ e^{j3\pi/4} \ -e^{j3\pi/4} \ 1 \ -1]$
n=7: $\varphi=[e^{j3\pi/4} \ -e^{j3\pi/4} \ e^{j3\pi/4} \ -e^{j3\pi/4} \ j \ -j]$ Rank 7: W2a handles the first layer set (first three layers) with 2 bits (four choices), W2b handles the second layer set (last four layers) with 1 bit (two choices).
n=0: $\varphi=[e^{j0\pi/4} \ -e^{j0\pi/4} \ e^{j0\pi/4} \ 1 \ -1 \ 1 \ -1]$
n=1: $\varphi=[e^{j0\pi/4} \ -e^{j0\pi/4} \ e^{j0\pi/4} \ j \ -j \ j \ -j]$
n=2: $\varphi=[e^{j1\pi/4} \ -e^{j1\pi/4} \ e^{j1\pi/4} \ 1 \ -1 \ 1 \ -1]$
n=3: $\varphi=[e^{j1\pi/4} \ -e^{j1\pi/4} \ e^{j1\pi/4} \ j \ -j \ j \ -j]$
n=4: $\varphi=[e^{j2\pi/4} \ -e^{j2\pi/4} \ e^{j2\pi/4} \ 1 \ -1 \ 1 \ -1]$
n=5: $\varphi=[e^{j2\pi/4} \ -e^{j2\pi/4} \ e^{j2\pi/4} \ j \ -j \ j \ -j]$
n=6: $\varphi=[e^{j3\pi/4} \ -e^{j3\pi/4} \ e^{j3\pi/4} \ 1 \ -1 \ 1 \ -1]$
n=7: $\varphi=[e^{j3\pi/4} \ -e^{j3\pi/4} \ e^{j3\pi/4} \ j \ -j \ j \ -j]$ Rank 8: W2a handles the first layer set (first four layers) with 2 bits (four choices), W2b handles the second layer set (last four layers) with 1 bit (two choices):
n=0: $\varphi=[e^{j0\pi/4} \ -e^{j0\pi/4} \ e^{j0\pi/4} \ -e^{j0\pi/4} \ 1 \ -1 \ 1 \ -1]$
n=1: $\varphi=[e^{j0\pi/4} \ -e^{j0\pi/4} \ e^{j0\pi/4} \ -e^{j0\pi/4} \ j \ -j \ j \ -j]$
n=2: $\varphi=[e^{j1\pi/4} \ -e^{j1\pi/4} \ e^{j1\pi/4} \ -e^{j1\pi/4} \ 1 \ -1 \ 1 \ -1]$
n=3: $\varphi=[e^{j1\pi/4} \ -e^{j1\pi/4} \ e^{j1\pi/4} \ -e^{j1\pi/4} \ j \ -j \ j \ -j]$
n=4: $\varphi=[e^{j2\pi/4} \ -e^{j2\pi/4} \ e^{j2\pi/4} \ -e^{j2\pi/4} \ 1 \ -1 \ 1 \ -1]$
n=5: $\varphi=[e^{j2\pi/4} \ -e^{j2\pi/4} \ e^{j2\pi/4} \ -e^{j2\pi/4} \ j \ -j \ j \ -j]$
n=6: $\varphi=[e^{j3\pi/4} \ -e^{j3\pi/4} \ e^{j3\pi/4} \ -e^{j3\pi/4} \ 1 \ -1 \ 1 \ -1]$
n=7: $\varphi=[e^{j3\pi/4} \ -e^{j3\pi/4} \ e^{j3\pi/4} \ -e^{j3\pi/4} \ j \ -j \ j \ -j]$ Note that in the above-described Example Options, the bits for the first set of layers and the bits for the second set of layers are described in the formulas as being signaled together. For example, with Option 3, the above formulas assume the 3 bits are reported per sub-band or are reported on a wideband basis (if there is no sub-band reporting). Note that we can modify the above structure in a straightforward way where the bits that specify the $\varphi_j$ for the first set of layers are reported (fed back) independently from the bits that specify the $\varphi_j$ for the second set of layers. By decoupling those bits, the bits for the first layer set can either be signaled on a wideband basis or on a narrowband (sub-band) basis. Similarly, the bits for the second layer set can be either signaled on a wideband basis or on a narrowband (sub-band) basis. Furthermore, the bits for the first layer can be signaled on a wideband basis, while the bits for the second layer can be signaled on a sub-band basis. Likewise, the bits for the first layer can be signaled on a sub-band basis while the bits for the second layer can be signaled on a wideband basis.

The above example codebook structure assumes that each pair of layers are formed from the same DFT beam in B, as shown by the structure of $W_2$ where columns l and l+1 (for layers l and l+1 respectively) consist of the indicator vector $e_{k_i}$ where i=floor (l/2). To preserve the orthogonality of the layers formed from the same DFT beam in B, it becomes necessary for those layers to be precoded with the same resolution in $W_2$. Therefore, it may be necessary for pairs of layers formed from the same DFT beam in B to either both be in W2a or both be in W2b. As a result, it may be necessary for the layer set definition (i.e., which layers belong to layer set A and which layers belong to layer set B) to be determined according to the beam pairs in $W_1$, which might not necessarily correspond to the codeword to layer mapping strategy. In other words, the set of layers that are precoded with a higher resolution might not exactly correspond to the set of layers over which one of the codewords is mapped. For example, in the above Example Option 2, rank 6, the first four layers have 2 bit resolution in $W_2$, while the last two layers have zero bits resolution in $W_2$. However, the codeword to layer mapping could be defined so that the first codeword occupies the first three layers, while the second codeword occupies the last three layers (in which case the layers in W2a do not exactly correspond to the layers mapped to the first codeword). An option is to define the codeword to layer mapping so as to align the codeword-to-layer mapping with how the layers are mapped to W2a (high resolution) versus W2b (low resolution).

Figure 4:
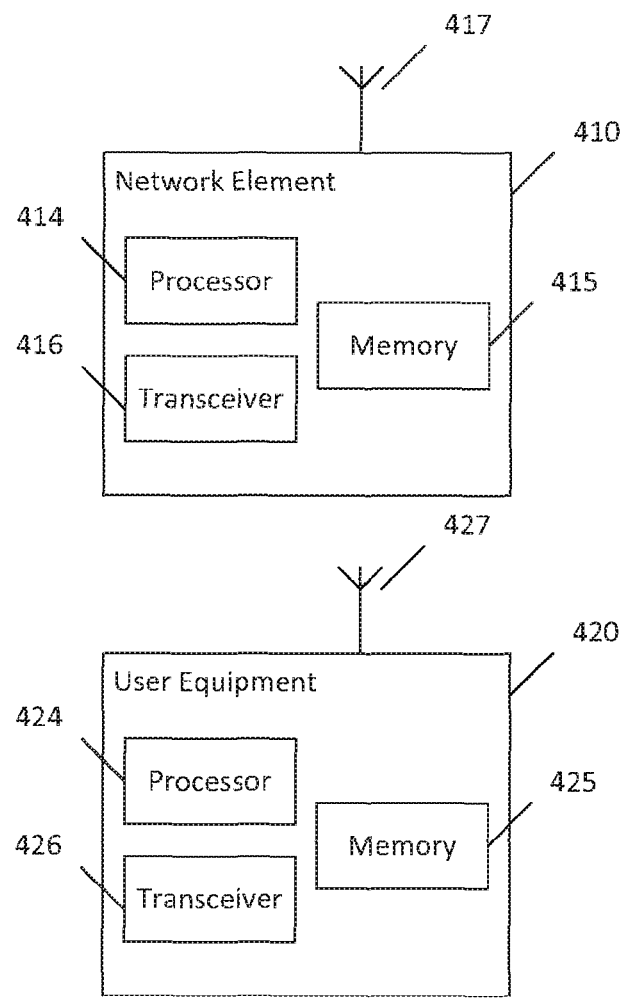
FIG. 4 illustrates a system according to certain embodiments.

FIG. 4 illustrates a system according to certain embodiments of the invention. It should be understood that each block of the flowchart of FIG. 1 or FIG. 3 may be implemented by various means or their combinations, such as hardware, software, firmware, one or more processors and/or circuitry. In one embodiment, a system may include several devices, such as, for example, network element 410 and user equipment (UE) or user device 420. The system may include more than one UE 420 and more than one network element 410, although only one of each is shown for the purposes of illustration. A network element can be an access point, a base station, an eNode B (eNB), or any other network element, such as a next generation Node B (gNB).

Each of these devices may include at least one processor or control unit or module, respectively indicated as 414 and 424. At least one memory may be provided in each device, and indicated as 415 and 425, respectively. The memory may include computer program instructions or computer code contained therein, for example for carrying out the embodiments described above. One or more transceiver 416 and 426 may be provided, and each device may also include an antenna, respectively illustrated as 417 and 427. Although only one antenna each is shown, many antennas and multiple antenna elements may be provided to each of the devices. Other configurations of these devices, for example, may be provided. For example, network element 410 and UE 420 may be additionally configured for wired communication, in addition to wireless communication, and in such a case antennas 417 and 427 may illustrate any form of communication hardware, without being limited to merely an antenna.

Transceivers 416 and 426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 420 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 420 may be a sensor or smart meter, or other device that may usually be configured for a single location.

In an exemplifying embodiment, an apparatus, such as a node or user device, may include means for carrying out embodiments described above in relation to FIG. 1 or FIG. 3.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 410 and/or UE 420, to perform any of the processes described above (see, for example, FIG. 1 or FIG. 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 4 illustrates a system including a network element 410 and a UE 420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

According to a first embodiment, a method can include determining a first partition of a precoding matrix with a higher resolution and a second partition of the precoding matrix with a lower resolution. The method can also include feeding back the first partition and the second partition.

In a variant, the precoding matrix can be W2, the first partition can be W2a, and the second partition can be W2b, wherein W2=[W2a W2b].

In a variant the first partition W2a can be used for transmission from a first panel, and the second partition W2b can be used for transmission from a second panel.

In a variant the first partition W2a can be used for transmission from a first transmission point, and the second partition W2b can be used for transmission from a second transmission point, where the transmission is non-coherent.

In a variant, the method can further include determining and feeding back a matrix containing beams from an oversampled discrete Fourier transform grid.

In a variant, the matrix containing the beams can be W1.

In a variant, the method can further include transmitting with the feeding back, an indication of a first set of layers corresponding to the first partition and a second set of layers corresponding to the second partition.

In a variant, the feeding back of the first partition can be done with a different periodicity from the feeding back of the second partition.

In a variant, when a total number of even layers are transmitted, there can be an uneven number of layers transmitted by the higher and lower resolution layers. For example, if the rank is 4, then one layer can be transmitted as a higher resolution layer and the other three layers can be transmitted as lower resolution layers.

In a variant, the method can include determining a first set of layers for the first partition and a second set of layers for the second partition.

In a variant, the method can include providing a codeword to layer mapping to a base station.

According to a second embodiment, a method can include receiving, as feedback, a first partition of a precoding matrix with a higher resolution and a second partition of the precoding matrix with a lower resolution. The method can also include communicating with a user equipment based on received first partition and second partition.

According to an additional embodiment, a signaling bit can be used by the UE to indicate to the base that the practice of splitting the layers into high versus low resolution is beneficial based on channel conditions or other related factors. An example method for signaling this bit is in a short PUCCH (physical uplink control channel), where this bit would indicate either the use of the high versus low resolution splitting or would indicate that all layers will have the same resolution. Another option is to have the UE indicate to the base station (e.g., during initial access/registration into the cell) whether it is capable of handling the strategy of splitting the layers into high resolution versus low resolution.

In a variant, the precoding matrix can be W2, the first partition can be W2a, and the second partition can be W2b, wherein W2=[W2a W2b].

In a variant, the method can include receiving a matrix containing beams from an oversampled discrete Fourier transform grid.

In a variant, the matrix containing the beams can be W1.

In a variant, the method can further include receiving with the feedback, an indication of a first set of layers corresponding to the first partition and a second set of layers corresponding to the second partition.

In a variant, the feedback of the first partition can have a different periodicity from the feedback of the second partition.

In a variant, the method can include receiving a codeword to layer mapping from a user equipment.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

We claim:

1. An apparatus comprising:
   at least one processor; and
   at least one memory including computer program code;
   the at least one memory and the computer program code configured to, with the at least one processor, cause the apparatus at least to:
   determine a first partition of a precoding matrix with a higher resolution and a second partition of the precoding matrix with a lower resolution; and,
   feed back an index of the precoding matrix to a base station, wherein
   the precoding matrix including the first partition and the second partition indicates codeword to layer mapping.

2. An apparatus of claim 1, wherein the at least one memory and the computer program code configured to, with the at least one processor, cause the apparatus at least to transmit to the base station, a signaling bit indicating that splitting layers into a high versus a low resolution is preferred.

3. An apparatus of claim 2, wherein the signaling bit is transmitted in a short physical uplink control channel.

4. An apparatus of claim 2, wherein the signaling bit either indicates the splitting of the layers into the high versus the low resolution or indicates that all layers have same resolution.

5. An apparatus of claim 1, wherein the at least one memory and the computer program code configured to, with the at least one processor, cause the apparatus at least to transmit to the base station, an indication whether the apparatus is capable of handling splitting layers into a high versus a low resolution.

6. An apparatus of claim 1, wherein the precoding matrix comprises W2, the first partition comprises W2a, the second partition comprises W2b, and W2=[W2a W2b].

7. An apparatus of claim 6, wherein the first partition W2a is used for transmission from a first panel, and the second partition W2b is used for transmission from a second panel.

8. An apparatus of claim 6, wherein the first partition W2a is used for transmission from a first transmission point, and the second partition W2b is used for transmission from a second transmission point.

9. An apparatus of claim 8, wherein the transmission from the first transmission point and the transmission from the second transmission point are non-coherent.

10. An apparatus of claim 1, wherein the at least one memory and the computer program code configured to, with the at least one processor, cause the apparatus at least to determine and feed back a matrix containing beams from an oversampled discrete Fourier transform grid.

11. An apparatus of claim 10, wherein the matrix containing the beams comprises $W_1$.

12. An apparatus of claim 10, wherein the at least one memory and the computer program code configured to, with the at least one processor, cause the apparatus at least to transmit with the feeding back, an indication of a first set of layers corresponding to the first partition and a second set of layers corresponding to the second partition.

13. An apparatus of claim 1, wherein, when a total number of transmitted layers is an even number, an odd number of layers are transmitted by higher and lower resolution layers.

14. An apparatus of claim 1, wherein the at least one memory and the computer program code configured to, with the at least one processor, cause the apparatus at least to determine a first set of layers for the first partition and a second set of layers for the second partition.

15. A method comprising:
    determining, at a user equipment, a first partition of a precoding matrix with a higher resolution and a second partition of the precoding matrix with a lower resolution; and,
    feeding back an index of the precoding matrix to a base station, wherein
    the precoding matrix including the first partition and the second partition indicates codeword to layer mapping.

16. A method of claim 15, wherein the precoding matrix comprises W2, the first partition comprises W2a, the second partition comprises W2b, and W2=[W2a W2b].

17. A method of claim 16, wherein the first partition W2a is used for transmission from a first panel, and the second partition W2b is used for transmission from a second panel.

18. A method of claim 15, further comprising determining a first set of layers for the first partition and a second set of layers for the second partition.

19. An apparatus comprising:
    at least one processor; and
    at least one memory including computer program code;
    the at least one memory and the computer program code configured to, with the at least one processor, cause the apparatus at least to:
    receive, from a user equipment, as feedback, an index of a precoding matrix, wherein the precoding matrix comprises a first partition of the precoding matrix with a higher resolution and a second partition of the precoding matrix with a lower resolution, and the precoding matrix indicates codeword to layer mapping; and, communicate with the user equipment based on the received index.

20. An apparatus of claim 19, wherein the precoding matrix comprises W2, the first partition comprises W2a, the second partition comprises W2b, and W2=[W2a W2b].

* * * * *